United States Patent
Lambert et al.

(10) Patent No.: US 10,012,258 B2
(45) Date of Patent: Jul. 3, 2018

(54) LOCKING DEVICE FOR A THREADED FASTENER

(71) Applicant: Parker Hannifin Manufacturing Limited, Hertfordshire (GB)

(72) Inventors: Daniel James Lambert, North Devon (GB); Marcin M Gorczynski, Devon (GB)

(73) Assignee: Parker Hannifin Manufacturing Limited, Devon (GB)

( * ) Notice: Subject to any disclaimer, the term of this patent is extended or adjusted under 35 U.S.C. 154(b) by 364 days.

(21) Appl. No.: 14/735,681

(22) Filed: Jun. 10, 2015

(65) Prior Publication Data

US 2015/0354617 A1    Dec. 10, 2015

(30) Foreign Application Priority Data

Jun. 10, 2014    (GB) .................................. 1410315.4

(51) Int. Cl.
| | |
|---|---|
| F16B 39/04 | (2006.01) |
| F16B 39/10 | (2006.01) |
| F16B 2/06 | (2006.01) |
| F16B 2/08 | (2006.01) |
| F16B 39/00 | (2006.01) |

(52) U.S. Cl.
CPC ............. *F16B 39/10* (2013.01); *F16B 2/065* (2013.01); *F16B 2/08* (2013.01); *F16B 39/00* (2013.01); *F16B 39/101* (2013.01); *Y10T 24/44239* (2015.01); *Y10T 24/44256* (2015.01)

(58) Field of Classification Search
CPC ....... F16B 39/101; F16B 39/103; F16B 19/00
USPC ........ 411/87, 88, 90, 92, 95; 285/80, 81, 92, 285/180, 313
See application file for complete search history.

(56) References Cited

U.S. PATENT DOCUMENTS

| | | | |
|---|---|---|---|
| 384,378 A | * | 6/1888 | Merress |
| 385,888 A | * | 7/1888 | Van Wart |

(Continued)

FOREIGN PATENT DOCUMENTS

WO    94/11609    5/1994

OTHER PUBLICATIONS

European Search Report and Search Opinion for European Application No. 15 171 528 dated Sep. 29, 2015.
Search Report for GB1410315.4 dated Aug. 29, 2014.

*Primary Examiner* — Gary W Estremsky
(74) *Attorney, Agent, or Firm* — Renner, Otto, Boisselle & Sklar, LLP

(57) ABSTRACT

A locking device for a component having at least one and preferably two threaded fasteners is provided. The device includes a first clamping section configured to be secured around a first threaded fastener, and a second clamping section at a spaced location from the first clamping section arranged to be secured around a further element relative to which the first fastener is rotational. The second element may be a second threaded fastener, or a fixed feature such as the body of a pipe coupling. A bridging element is also provided that connects the two clamping sections and prevents rotation of the first and second clamping sections relative to each other. The clamping sections are configured to surround, compress and/or deform against the circumferential surface of a part of the fastener, which may be a nut or a bolt head, such that the clamping section is rotationally fixed relative to the fastener.

18 Claims, 4 Drawing Sheets

(56) References Cited

U.S. PATENT DOCUMENTS

| | | | | |
|---|---|---|---|---|
| 944,288 | A | * | 12/1909 | Smith |
| 1,332,521 | A | * | 3/1920 | Rivers .................. F16B 39/101 |
| | | | | 411/87 |
| 1,359,127 | A | * | 11/1920 | Tedder ......................... 126/318 |
| 1,365,477 | A | * | 1/1921 | Gabriel ................ G01F 15/007 |
| | | | | 285/80 |
| 1,460,205 | A | * | 6/1923 | Martin .................. F16L 339/10 |
| | | | | 411/130 |
| 1,473,751 | A | * | 11/1923 | Walker ................ G01F 15/185 |
| | | | | 285/30 |
| 1,725,790 | A | | 8/1929 | Halagarda |
| 1,919,701 | A | * | 7/1933 | Morreale ............. G01F 15/007 |
| | | | | 285/80 |
| 3,517,701 | A | * | 6/1970 | Smith ................... F16L 55/179 |
| | | | | 138/97 |
| 5,350,201 | A | * | 9/1994 | Bynum ................ F16L 19/005 |
| | | | | 285/330 |
| 5,368,337 | A | * | 11/1994 | Torres ..................... F16L 33/02 |
| | | | | 285/114 |
| 5,466,014 | A | * | 11/1995 | Cummings ......... F16L 19/0212 |
| | | | | 285/148.26 |
| 6,450,746 | B1 | * | 9/2002 | Kirimoto ........... F16B 23/0061 |
| | | | | 411/102 |
| 6,644,075 | B2 | * | 11/2003 | Thompson ........... F16L 23/003 |
| | | | | 403/316 |
| 6,837,787 | B2 | * | 1/2005 | Crook ................ F24F 13/0209 |
| | | | | 138/106 |
| 7,980,598 | B2 | * | 7/2011 | Tsubota ............... F16L 19/005 |
| | | | | 285/420 |
| 8,038,175 | B2 | * | 10/2011 | Crook ...................... F16L 3/02 |
| | | | | 248/316.1 |
| 9,534,718 | B2 | * | 1/2017 | O'Neil ................... F16L 43/02 |
| 2009/0116928 | A1 | * | 5/2009 | Marczynski .......... F16B 39/101 |
| | | | | 411/87 |

* cited by examiner

LOCKING DEVICE FOR A THREADED FASTENER

RELATED APPLICATIONS

This application claims priority of UK Patent Application Number GB 1410315.4 filed on Jun. 10, 2014, which is incorporated herein by reference in its entirety.

TECHNICAL FIELD

The present application relates to locking device for a fastener, and in particular a locking device for preventing loosening of threaded fasteners.

BACKGROUND

Safety wiring or lock wiring is a method used for preventing fasteners such as bolts from loosening in use. The practice of lock wiring involves the securing together of two or more parts of a fastener with a thin gauge metal wire, referred to as lock wire. The lock wire is secured to the bolts in such a way that the forces which would otherwise cause the parts to loosen act to further tighten the lock wire, thereby increasing the resistance to loosening. Lock wiring is commonly used for applications where a high degree of mechanical reliability of the fastening is important, such as in aircraft where the parts experience large vibration forces and a critical environment. Locking wiring also provides a mechanism of tamper proofing the fastenings, as the lock wire must be broken to allow the fastening to be loosened. The presence of the wire also provides a visual indication to the maintenance engineer that the bolt has been properly torqued, or if the wire is seen to be broken that tampering has occurred.

The application of lock wire must be performed properly by a skilled installation engineer in order to ensure the bolt or other threaded fastening is proper secured. Referring to FIG. 1, during wire locking a hole 2 must be drilled into the accessible part of the threaded fastener 1, which may be the head of the bolt 4, as shown in FIG. 1, or a nut. The fastener 1 is then secured in position and the correct fastening torque applied. Where the component includes more than one fastener, for example a threaded pipe coupling having two nuts, both of the nuts of the fasteners are drilled and secured. A length of lock wire 6 is then cut to length and as shown in FIG. 2 is then threaded through the holes 2 of the each of the fasteners 1, 8 in turn, with the wire 6 being twisted to apply a required tension and to secure the wire 6 in position between the fasteners 1,8. When this process is completed, the loose end of the wire are cut at a suitable length to ensure the ends of the wire are held together and do not unravel.

SUMMARY

Lock wiring has been found to be an effective means of preventing loosening of parts. However, the process of lock wiring is very time consuming, and can average around 15 minutes per fastener. It is also a technical procedure that requires a skilled installer to apply the lock wire correctly. The installer must be able to ensure that the optimum tension is applied to the lock wire, and that the wire has been correctly twisted in the appropriate direction and at the proper angles. It is therefore difficult to ensure that lock wiring is consistently undertaken in a correct and safe manner. Lock wiring also produces waste parts resulting from the clipping of the wire that as well require careful removal to prevent fouling, as well as these sharp metal parts presenting a potential injury risk.

It is therefore desirable to provide an improved locking mechanism for threaded fasteners which addresses the above described problems and/or which offers improvements generally.

According to the present application, there is provided a locking device as described in the accompanying claims.

In an embodiment of the locking device there is provided a locking device for a component having at least one and preferably two threaded fasteners; the device comprising a first clamping section configured to be secured around a first threaded fastener, and a second clamping section at a spaced location from the first clamping section arranged to be secured around a further element relative to which the first fastener is rotational. The second element may be a second threaded fastener, or a fixed feature such as the body of a pipe coupling. A bridging element is also provided that connects the two clamping sections and prevents rotation of the first and second clamping sections relative to each other. The clamping sections are configured to surround, compress and/or deform against the circumferential surface of a part of the fastener, which may be a nut or a bolt head, such that the clamping section is rotationally fixed relative to the fastener. As the clamping sections are rotationally fixed relative to each other, any rotation of one of the fasteners which would lead to loosening of the fastener is prohibited by the connection to the second clamping section secured to the second fastener. In a linear, coaxial arrangement where the fasteners are threaded in opposing directions, any loosening rotational force provided to the first clamping member generates a force in the tightening direction of the second clamping member, thereby positively opposing loosening of the first fastener.

The first and second clamping sections may each comprise an elongate strap. A strap configuration may be easily provided around a fastener.

The strap of each clamping section is preferably reconfigurable between a first expanded configuration in which it is able to be provided around the corresponding fastener, and a clamped configuration. In the expanded configuration the diameter of the clamping section is greater than the diameter of the fastener allowing the clamping section to be provided around the fastener. The enlarger diameter is due to the spacing between the ends of the clamping strap. The length of the clamping strap, which in use defines its circumference, is shorter than the circumference of the fastener to which it is applied in any state. This allows a gap between the ends which is closed by a fastener in use to apply the required tension.

The first and second clamping sections may each comprise a flexible annular strap having circumferentially opposing free ends, the strap being configurable between a clamped configuration and an open configuration in which the free ends are separated to expand the strap to allow the strap to be provided around the corresponding threaded fastener. Separation of the free ends defines a receiving gap allowing the fastener to which the clamp is being applied to be received into the strap through the gap in a radial direction. The clamp is therefore able to be retrofitted to an in situ fastener.

The clamping sections may each comprise a locking mechanism arranged to hold the clamping sections in the clamped configuration. Preferably the locking mechanism is arranged to provide a compressive force to compress the strap to the clamped configuration to cause the strap to apply a corresponding clamping force about the threaded fastener.

The strap is therefore expanded to provide it around the fastener, and then closed, with the locking mechanism then applying a compressive force to cause the strap to clamp against the fastener.

The straps may each include outwardly projecting tabs arranged proximate the free ends configured to be engaged by the locking mechanism to compress the strap. The outwardly projecting tabs may be integrally formed with the straps and are preferably formed in a bending operation.

The locking mechanism can comprise a threaded fastener having engagement features at opposing ends arranged to engage the locking tabs to urge the tabs together as the threaded fastener is tightened. The engagement features may a bolt head and a nut. The use of a threaded fastening such as a bolt allows the clamping force to be easily and selectively applied and varied.

At least one of the locking tabs defines at least part of the bridging element. In an embodiment the clamping sections may be connected by one or more common or independent tabs or projections which may partially or fully bridge between the clamping sections.

At least one of the straps includes a circumferentially extending channel along at least part of its length. In one embodiment, at least one of the straps includes a channel that defines two axially spaced clamping arms. The ends of the channels can be circumferentially spaced from the free ends of the strap such that the region proximate the locking tabs have increased strength.

The locking device is formed from metal and is formed such that the strap is held in an annular form in the relaxed state and is able to flex to the open position and resilient return to the original position.

BRIEF DESCRIPTION OF THE DRAWINGS

The locking device of the present application will now be described by way of example only with reference to the following illustrative figures in which.

DETAILED DESCRIPTION OF THE DRAWINGS

Figure 3:
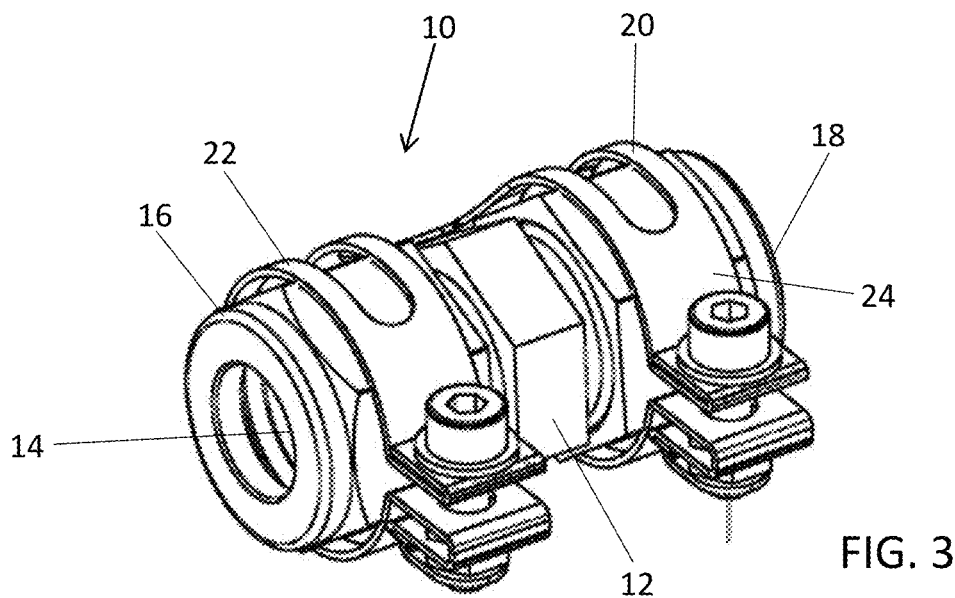
FIG. 3 shows a locking device according to an embodiment secured to a pipe coupling.

Referring to FIG. 3, a pipe coupling 10 comprises an inner coupling body 12 having a central bore 14 extending axially therethrough. The inner valve body 12 comprises threaded portions located on its outer surface at axially opposed ends. Threaded nuts 16 and 18 are arranged at the axially opposed ends which secure to the threaded end sections of the inner body 12. The connector nuts 16 and 18 also include inner bores configured to receive pipe sections to be joined. A compressive element is provided within the coupling 10 which is compressed onto the pipe when the nuts 14 and 18 are tightened on to the respective threaded fitting of the inner body section 12 to create a seal between the coupling and the corresponding pipes. During connection the pipes are inserted into the opposing ends of the inner body section 12 with the nuts 14 and 18 received about the ends of the pipes. When the ends of the pipes are properly received within the body section 12 the nuts 14 and 18 are fastened on to the respective ends of the inner body 12 to cause the compressive elements to seal against the pipes. The threaded sections on the opposing ends of the inner body section 12 are opposingly arranged having the same handed thread (i.e. threads are either both left handed or both right handed), such that the nuts 14 and 18 are rotated in opposing directions relative to each other to tighten.

Figure 1:
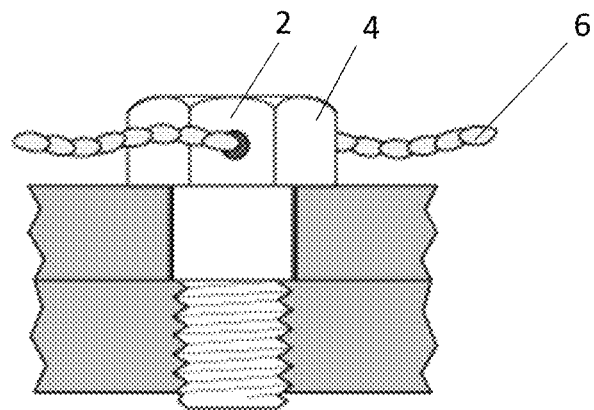
FIG. 1 shows a prior art lock wired bolt.
Figure 2:
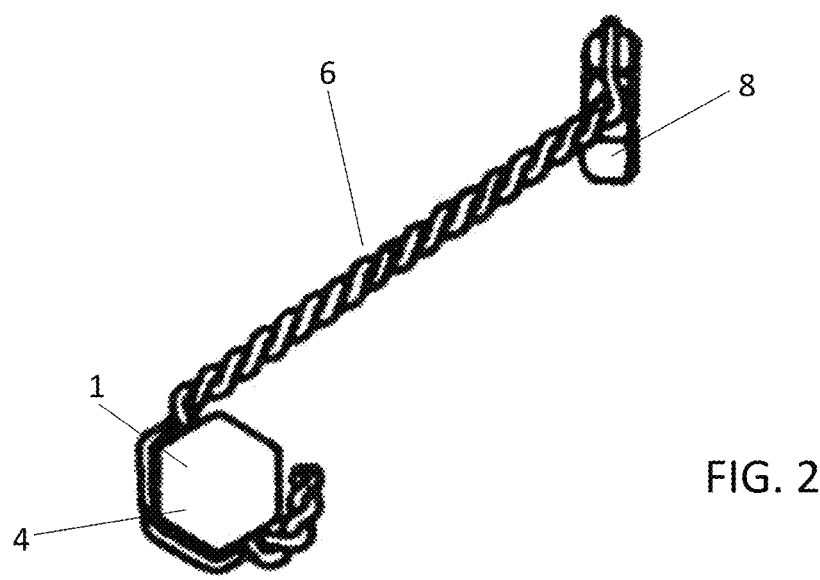
FIG. 2 shows a pair of wire locked bolts according to the prior art.
Figure 4:
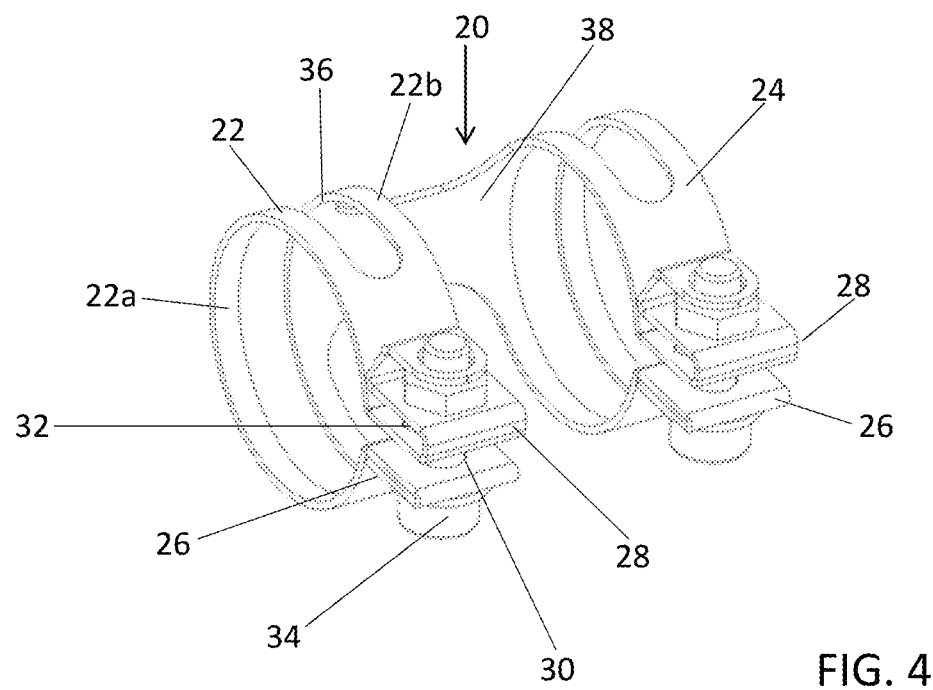
FIG. 4 shows the locking device of FIG. 3.

A locking device 20 is provided to secure the nuts 14 and 18 in position in their fastened state. The locking device 20 comprises a first clamping section 22 which is FIG. 2 to be secured about the first nut 16, and a second clamping section 24 that is designed to be secured about the second nut 18. As shown in FIG. 4 the first clamping section 22 comprises a substantially annular elongate strap arranged substantially orthogonally to the longitudinal axis of the locking device 20. The annular strap section is split at a fixed point around the circumference to define free ends 26 and 28. The strap section 22 is bent at the free ends 26 and 28 to define locking tabs which extend radially outwards from the strap section 22. Each of the locking tabs 26 and 28 include an aperture 30 and 32 respectively for receiving a locking fastener, which in the embodiment shown in FIGS. 3 and 4 is a nut and bolt threaded fastener 34. The shaft of the bolt 34 extends through the apertures 30 and 32 with the bolt head and the nut being arranged on opposing outer surfaces of the locking tabs 26 and 28. In a free unclamped state the locking tabs 26 and 28 are spaced from each other a first distance. Tightening of the bolt 34 compresses the locking tabs 26 and 28 causing them to move towards each other, which in use generates a clamping force if the strap.

The body of the strap section 22 includes a central channel 36 which extends circumferentially around a substantial portion of the strap section 22, and which is circumferentially spaced at its ends from the locking tabs 26 and 28. The channel 36 is arranged centrally across the width of the locking strap 22 to define axially spaced strap proportions or arms 22a and 22b, with the strap section 22 having a full width proximate the locking tabs 26 and 28. The channel 36 advantageously significantly reduces the amount of material forming the strap section 22, while the provision of a full width of strap proximate the locking tabs 26 and 28 maintains additional strength at those locations.

The second clamping section 24 has substantially the same configuration as the first locking section 22. The second clamping section 24 is longitudinally spaced from the locking section 22 a distance which corresponds to the axial spacing of the nuts 14 and 18 when fully tightened. The clamping sections 22 and 24 are spaced and connected by a bridging section 38. The bridging section 38 is arranged on a diametrically opposed side of the strap sections 22 and 24 to the locking tabs, and holds the first clamping section 22 and second clamping section 24 in a fixed axially spaced arrangement and also rotationally fixes the clamping section 22 and 24 relative to each other such so that relative rotation is prevented. In this embodiment the bridging section extends axially directly connecting the two clamping sections, although this arrangement is not essential and other embodiments are contemplated as will be described further. While the bridging member 38 preferably has a reduced width extending only partially in the circumferential to reduce or minimise material usage, it may be of greater width and may extend about the entire circumference such that the clamping sections and the bridge define an integral cylindrical form.

In use, with the bolts 34 removed, the locking tabs 26 and 28 of the first and second clamp sections 22 and 24 may be pulled apart to expand the spacing therebetween to expand the strap section and enable the clamping sections 22 and 24 to be placed over and around the nuts 14 and 18 in a direction perpendicular to the longitudinal access, with the nuts being received through the gap defined between the locking tabs 26 and 28. The thin strap sections 22*a* and 22*b* and 24*a* and 24*b* defined by the presence of the channels 36 provide additional flexibility to the strap sections 22 and 24 allowing them to easily flex and expand to be placed over and around the nuts 14 and 18. The locking device 12 is formed of a resilient metal material which is able to be resiliently flexed to expand around the nuts 14 and 18, and which also springs back to its original configuration when released around the nuts. Once the strap sections 22 and 24 are located around the corresponding nuts 14 and 18, they substantially surround the nuts, with the exception of the spacing between the free ends. The bolts 34 are inserted through the apertures 30 and 32 of the locking tabs 26 and 28, and the corresponding nut applies to the opposing end. Tightening of the bolt 34 forces the locking tabs 26 and 28 together causing the respective locking strap 22 or 24 to tighten around the corresponding nut 14 or 18 as the space between the locking tabs and 28 decreases.

As the bolt 34 is further tightened the clamping strap 22, 24 begins to deform around the corresponding nut 14 or 18. The thin form of the strap sections and in particular the reduced width sections 22*a*/22*b* or 24*a*/24*b* allow the strap to conform more easily to the shape of the corresponding nut 14. When fully tightened and formed around the corresponding nuts 14 and 18, the locking sections 22 are rotationally fixed to their corresponding nuts 14 and 18. Furthermore, the clamping sections 22 and 24 are rotationally fixed relative to each other by the bridge section 38. As the nuts 14 and 18 are threaded in the same direction but tighten in opposing directions relative to each other, any rotational force applied in a loosening direction to one of the clamping sections 22 or 24 causes a corresponding force in a tightening direction to the other clamping section 22 or 24. Therefore, with the clamping sections 22 and 24 secured to the corresponding nuts 14 and 18, loosening of the nuts from their fastened position is prevented.

The clamping device 20 is therefore quickly and easily applied to the pipe coupling 10 by the removal and refastening of only two bolts 34 using any appropriate standard tools such as a hexagonal key or screwdriver. The clamping device is also easily expanded and inserted over the pipe coupling 10. Fitting of the locking device 20 may therefore be rapidly achieved without any requirement for specialist technical skill. The material of the locking device 20 is also minimised and the device might be formed from sheet material through a series of simple stamping and bending operations and is therefore cheap and easy to manufacture. The material can be selected to be highly corrosion resistant.

Figure 5:
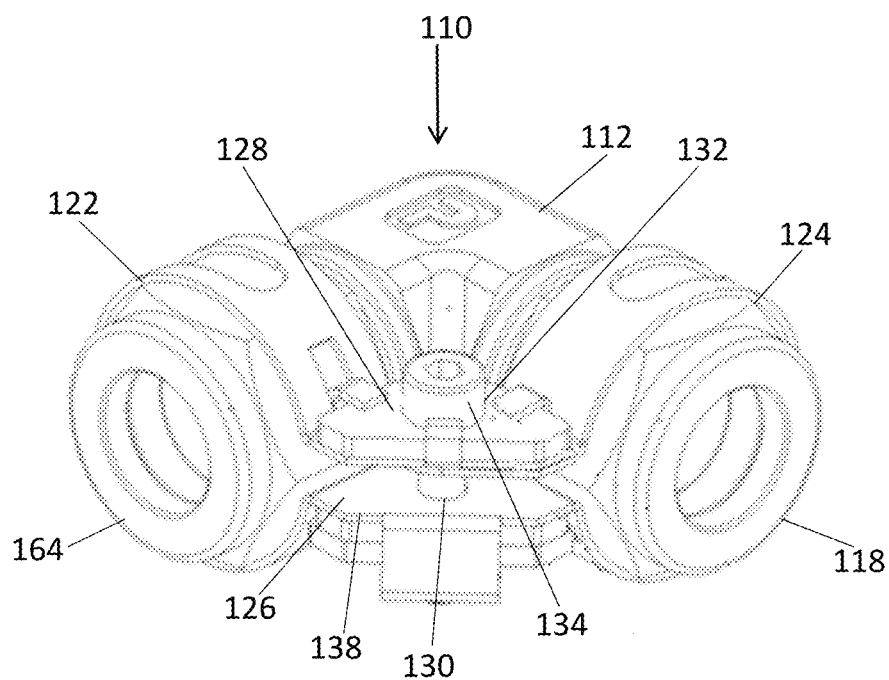
FIG. 5 shows a locking device according to another embodiment.

In a further embodiment shown in FIG. 5, the locking device 120 may be formed in a nonlinear arrangement to secure a 90 degree pipe coupling 110. The pipe coupling 110 comprises a substantially L-shaped body 112 having threaded opposing end sections to which are secured corresponding threaded nuts 114 and 118 which are arranged substantially at 90 degrees to each other. The first clamping section 122 is configured to be arranged about the first nut 114 and the second clamping section 124 is arranged about the second at 118. The first and second clamping sections 122 and 124 have substantially the same configuration as that described above the first embodiment with the exception of the form of the locking tabs. The locking tabs 126 and 128 of each of the clamping sections 122 and 124 extend outwardly from the clamping sections 122 and 124 towards each other so that they overlap and are arranged such that the apertures 130 and 132 of each of the locking tabs 126 and 128 align. As such a single common bolt 134 may be passed through the apertures 130 and 132 of both sets of locking tabs 126 and 128 securing the 2 sets of locking tabs together. When the locking tabs 126 and 128 of each clamping section 122 and 124 are connected in this way the locking tabs define the bridge 138 which links and rotationally fixes the clamping sections 122 and 124 open to each other. The clamps may also be configured for locking a cross connection by applying two clamping devices configured for securing an elbow connector to each side of the cross connector.

Figure 6:
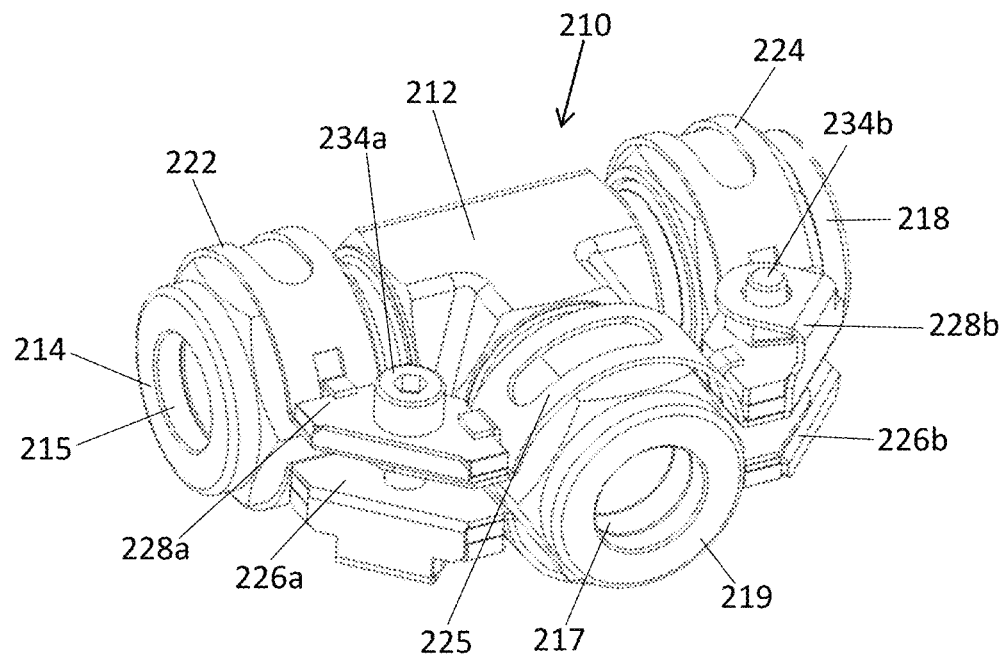
FIG. 6 shows a locking device according to another embodiment.

Another embodiment shown in FIG. 6 is configured for locking a T-piece pipe connector 210. The T-piece connector 210 includes a t-shaped body section 212 having a first bore 215 and a second bore 217 arranged at 90 degrees to the first bore, with the body 212 therefore having three pipe connection points, to which are secured connector nuts 214, 18 and 217. The first and second connector nuts 214 and 218 are coaxial, and the third connector nut 217 is arranged at 90 degrees at the end of the third projection of the body 212. First and second clamping sections 222 and 224 are configured in substantially the same manner as the clamping section described above, and are secured to the first and second connector nuts 214 and 218 respectively. First and second locking tabs 226*a* and 228*a* extends from the free ends of the first clamping section 222, and third and fourth locking tabs 226*b* and 228*b* extend from the second clamping section 224 at 90 degrees in the same direction as the second bore 217. A third clamping section 225 is arrange at 90 degrees to the first and second clamping section 222 and 224, and surrounds the third connector nut 217.

Figure 7:
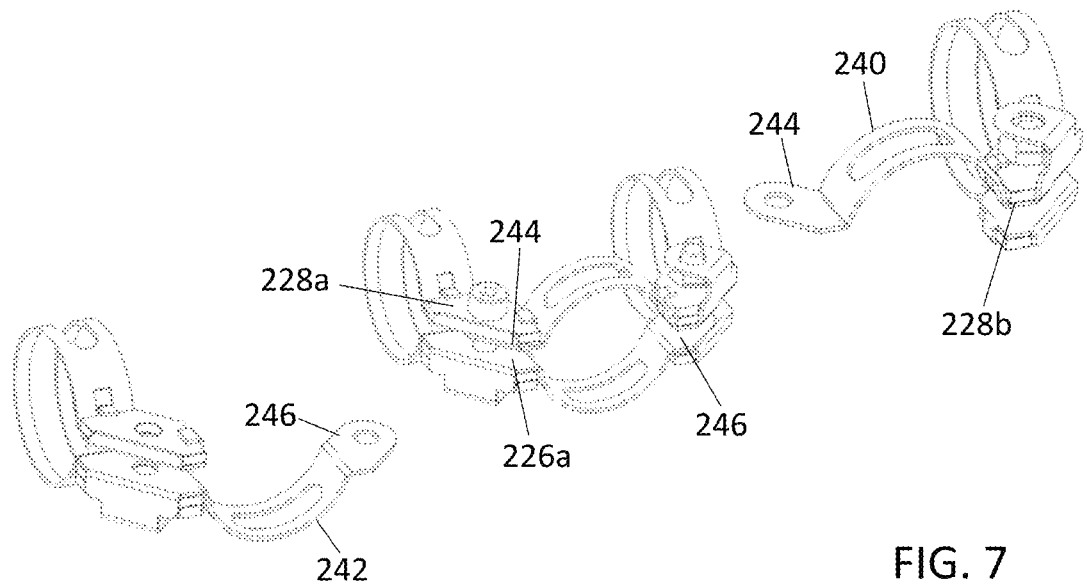
FIG. 7 is a series of exploded views of the arrangement of FIG. 6.

As shown in FIG. 7, the third clamping section 225 is formed from an upper curved strap section 240 and a lower curved strap section 242 that combine to form a substantially annular clamping strap 225. The upper strap section is connected at its first proximal end to the upper locking tab 228*b* of the second clamping section 218, such that the second clamp section and the upper strap section 240 share a common locking tab. A second locking tab 244 extends from the distal end of the strap section 240. The lower strap section 242 is connected at its first proximal end to the lower locking tab 226*a* of the first clamping section 214, such that the first clamp section 214 and the lower strap section 242 share a common locking tab. A second locking tab 246 extends from the distal end of the strap section 242.

When the first clamp section 214 is secured in position, the lower strap section 242 sits under the third connector nut 217. Similarly, when the second clamping section is attached the upper strap locates over the third nut 217. The aperture of the distal locking tab 244 of the upper strap aligns with the apertures of the first locking tabs 226*a* and 228*a*, and the aperture of the distal locking tab 246 of the lower strap aligns with the apertures of the second locking tabs 226*b* and 228*b*. As such, when the bolts 234*a* and 234*b* are secured through the locking tabs 226*a/b* and 228*a/b* the upper and lower straps and also locked in place and move towards the clamping position during tightening of the bolts 234.

In this embodiment, the third strap section 225 and the locking tabs 226*a/b* and 228*a/b* bridge and rotationally fix the first and second clamping sections 214 and 218. Rotation of the third clamping section 225 is prevented by virtue of it being fixed on both sides to the first and second clamping section 214 and 218. Each of the first and second clamping sections 214 and 216 is also rotationally fixed via their connection to the third clamping section which is arranged in an axis of rotation orthogonal to the direction of rotation of the first and second clamping sections 214 and 218.

Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. A locking device for a tube coupling having at least first and second threaded fasteners that secure to respective first and second end sections of an inner coupling body; the locking device comprising:
    a first clamping section configured to be secured around the first threaded fastener;
    a second clamping section configured to be secured around the second threaded fastener and spaced location from the first clamping section and arranged to be secured around the second threaded fastener relative to which the first threaded fastener is rotational; and
    a bridging element connecting the two clamping sections and preventing rotation of the first and second clamping sections relative to each other;
    wherein the first clamping section includes a first substantially annular elongate strap that is substantially orthogonal to a first clamping section axis, and the second clamping section includes a second substantially annular elongate strap that is substantially orthogonal to a second clamping section axis, and wherein the first and second clamping section axes are coaxial or are orthogonal to one another;
    wherein at least one of the straps includes a circumferentially extending channel along at least part of its length.

2. A locking device according to claim 1 wherein the strap is reconfigurable between a first expanded configuration in which it is able to be provided around the corresponding fastener, and a clamped configuration.

3. A locking device according to claim 2 wherein first and second elongate straps of the first and second clamping sections have circumferentially opposing free ends, the straps being configurable between a clamped configuration and an open configuration in which the free ends are separated to expand the strap to allow the strap to be provided around the corresponding threaded fastener.

4. A locking device according to claim 2 wherein the clamping sections comprise locking mechanism arranged to hold the clamping sections in the clamped configuration.

5. A locking device according to claim 4 wherein the locking mechanism is arranged to provide a compressive force to compress the strap to the clamped configuration to cause the strap to apply a corresponding clamping force about the threaded fastener.

6. A locking device according to claim 5 wherein the straps include outwardly projecting tabs arranged proximate the free ends configured to be engaged by the locking mechanism to compress the strap.

7. A locking device according to claim 6 wherein the locking mechanism comprises a threaded fastener having engagement features at opposing ends arranged to engage the locking tabs to urge the tabs together as the threaded fastener is tightened.

8. A locking device according to claim 7 wherein at least one of the locking tabs defines at least part of the bridging element.

9. A locking device according to claim 1 wherein the locking device is formed from metal.

10. A locking device according to claim 1 wherein the clamping sections are configured to deform around the outer surface of the fastener when compressed to the clamped configuration.

11. A locking device according to claim 1 in combination with a threaded fastener, wherein the first clamping section is secured around the threaded fastener.

12. A method of locking a tube coupling having at least first and second threaded fasteners that secure to respective first and second end sections of an inner coupling body with a locking device comprising:
    securing the first clamping section of the locking device around the first threaded fastener;
    securing the second clamping section spaced from the first clamping section around the second threaded fastener relative to which the first threaded fastener is rotational;
    preventing rotation of the first clamping section relative to the second clamping section with a bridging element that connects the first and second clamping sections to one another
    wherein the first clamping section includes a first substantially annular elongate strap that is substantially orthogonal to a first clamping section axis, and the second clamping section includes a second substantially annular elongate strap that is substantially orthogonal to a second clamping section axis, and wherein the first and second clamping section axes are coaxial or are orthogonal to one another;
    wherein at least one of the straps includes a circumferentially extending channel along at least part of its length.

13. A method according to claim 12, further comprising locking the first clamping and second clamping sections with a locking mechanism that is arranged to compress the first and second clamping sections in a clamped configuration about the first threaded fastener and the second element thereby applying a clamping force about the first threaded fastener and the second element.

14. A tube coupling and locking device assembly comprising:
    a tube coupling including an inner coupling body having a central bore extending threrethrough, and having at least first and second threaded portions that secure to respective first and second end sections of the inner coupling body,
    the first threaded portion having a first rotatable circumferential surface rotatable about a first longitudinal axis of the central bore and the second threaded portion having a second rotatable circumferential surface rotatable about a second longitudinal axis of the central bore;
    a locking device having a first clamping section secured to the first rotatable circumferential surface, a second clamping section secured to the second rotatable circumferential surface, wherein the first clamping section includes a first substantially annular elongate strap that is substantially orthogonal to the first longitudinal axis, and the second clamping section includes a second substantially annular elongate strap that is substantially orthogonal to the second longitudinal axis, and a bridging element rigidly connecting the first and second clamping sections;

wherein the locking device rigidly couples the first and second circumferential surfaces to one another such that any loosening rotational force provided to the first clamping member generates a force in the tightening direction of the second clamping member, thereby positively opposing loosening of the circumferential surfaces;

a locking mechanism arranged to hold the clamping sections in the clamped configuration.

15. A tube coupling and locking device assembly of claim 14, wherein the first and second threaded portions having the same handed threads.

16. A tube coupling and locking device assembly of claim 15, wherein the first and second threaded portions are oppositely arranged.

17. A tube coupling and locking device assembly of claim 14, wherein the first clamping section is clamped around the first rotatable circumferential surface, and the second clamping section is clamped around the second rotatable circumferential surface.

18. A tube coupling and locking device assembly of claim 17, wherein the first and second threaded portions are located at axially opposite ends and the first and second longitudinal axes of the central bore are coaxial or are orthogonal to one another.

* * * * *